Oct. 23, 1951     A. P. SMITH     2,572,065
RIM DRIVEN CIRCULAR SAW
Filed July 9, 1945     2 SHEETS—SHEET 1
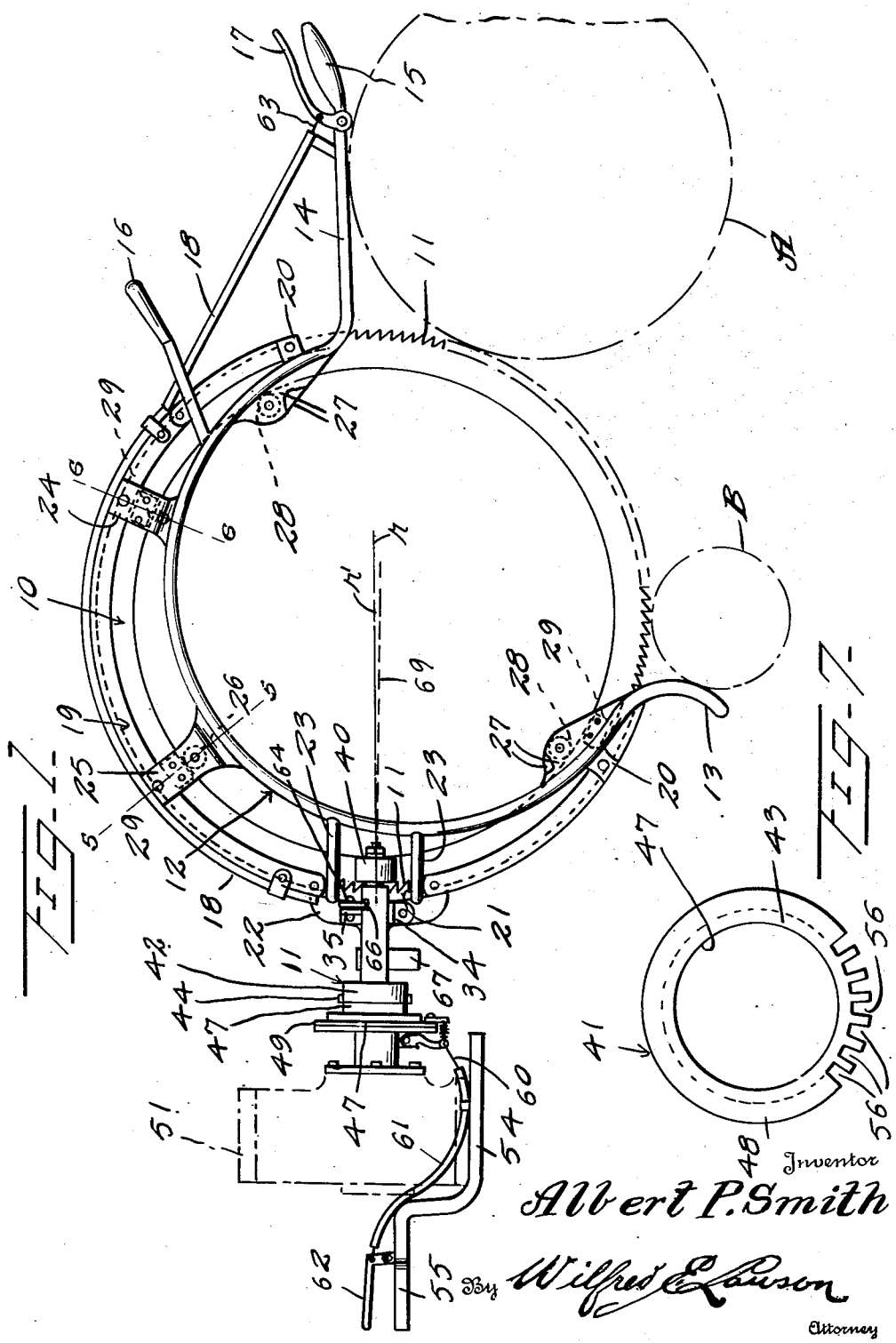
Inventor
Albert P. Smith
By Wilfred E. Lawson
Attorney

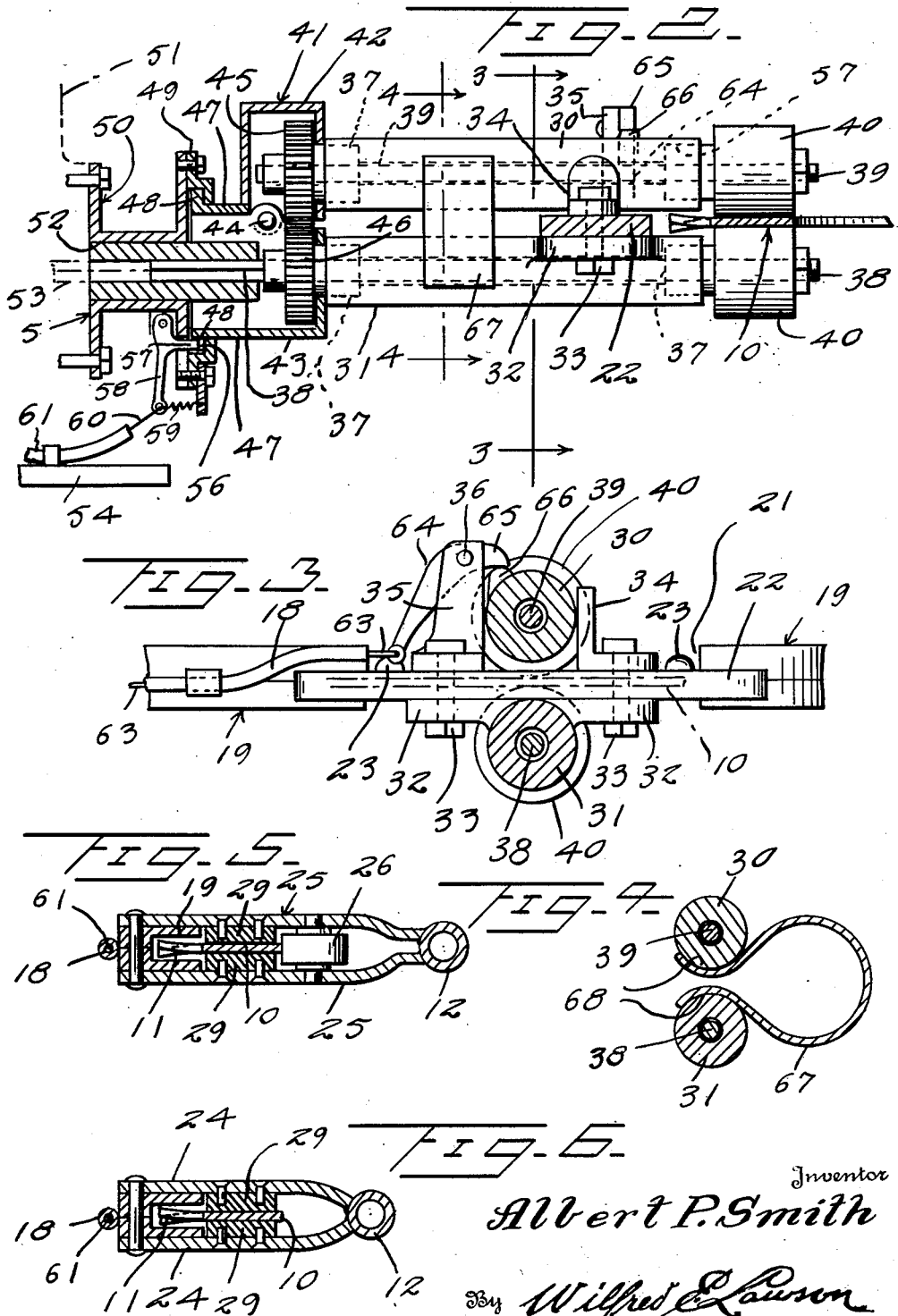

Patented Oct. 23, 1951

2,572,065

UNITED STATES PATENT OFFICE 2,572,065

RIM DRIVEN CIRCULAR SAW

Albert P. Smith, Ava, Mo., assignor, by mesne assignments, to Barker Saw Company, Springfield, Mo., a corporation of Missouri Application July 9, 1945, Serial No. 603,771

6 Claims. (Cl. 143—44)

1

This invention relates to the class of saws and pertains particularly to an improved type of circular saw which is designed to be held in the hands for use.

A principal object of the present invention is to provide a circular type saw designed for cutting standing trees or logs and so constructed that it may be supported in the hands during such use whereby it can be easily and quickly shifted about from one position to another as required, and with a minimum of effort.

Another object of the invention is to provide a hand supported circular saw in the form of an annulus, rotatably supported in a circular frame, with means for mounting an operating motor at one side of the frame and for readily controlling the driving connection between the motor and the saw while supporting the frame and motor in the hands.

Still another object of the invention is to provide a circular saw structure of the above described character wherein the driving connection between the saw and the motor includes a pair of opposed friction rollers between which the saw is positioned, with means for moving said rollers relative to the interposed saw so that the driving connection between the rollers and the saw may be regulated as desired.

Still another object of the invention is to provide, in a circular saw unit of the character stated, an auxiliary frame coupled with the saw carrying frame which is constructed to have log engaging arms which may be employed for balancing the saw against and with respect to a log to guide the saw into cutting position.

Other objects and advantages of the invention will become apparent as the description of the same proceeds and the invention will be best understood from a consideration of the following detailed description taken in connection with the accompanying drawings forming a part of the specification, with the understanding, however, that the invention is not confined to a strict conformity with the showing of the drawings but may be changed or modified so long as such changes or modifications mark no material departure from the salient features of the invention as expressed in the appended claims.

In the drawings:

Figure 1 is a view in side elevation of a saw constructed in accordance with the present invention and illustrating the use of the same.

Figure 2 is a view in bottom plan of the driving mechanism, the gear housing and casting by which the housing is coupled to the driving motor, being in horizontal section.

Figure 3 is a sectional view taken on the line 3—3 of Figure 2.

Figure 4 is a sectional view taken on the line 4—4 of Figure 2.

Figure 5 is a sectional view taken substantially on the line 5—5 of Figure 1.

Figure 6 is a sectional view taken substantially on the line 6—6 of Figure 1.

Figure 7 is a view illustrating the toothed flange of the gear housing.

Referring now more particularly to the drawings wherein like numerals of reference designate corresponding parts throughout the several views, the numeral 10 designates the saw which is illustrated as being in the form of a ring or annulus and having the teeth 11 around the outer periphery thereof.

In the illustration of the structure as presented in Figure 1, the saw is shown in position for cutting into a large log A and illustrating the use of the hereinafter described bracing arm.

The numeral 12 designates the frame of the machine which is preferably formed of suitable tubular material and is of little more than semi-circular form, terminating at one end in the outwardly curving bracing foot or foot piece 13 and at the opposite end being extended laterally to provide a brace 14 which terminates in a handle or hand grip 15. An additional hand grip 16 is connected with the frame above the brace foot 14 to facilitate handling the device.

Pivotally attached to the hand grip 15 is the control lever 17 and extending from a position at one side of this control lever is a tubular guide 18 which passes around the outer edge of the saw guard generally designated 19. The purpose of the tubular guide 18 will be hereinafter set forth.

The saw guard 19 is of divided or slotted form to receive the toothed edge of the saw 10 and, like the frame 12, it is in the form of an open or broken ring, having its end or terminal portions connected with the ends of the frame 12 by the bracket pieces 20. The saw guard 19 is of greater diameter than the frame 12 as shown and the free ends of the guard come into position for attachment to the ends of the frame 12, upon the outer side of the frame.

Upon the side of the frame 12 nearest the brace foot 13 the circular guard band 19 has a break 21 in the side portions through a short extent of such side portions, which is bridged by the bracket plate 22 which projects radially outwardly and is curved to substantially conform to the curvature of the guard.

Upon opposite sides of the break 21 brace arms 23 connect the guard 19 with the frame 12.

In addition to the connecting pieces 20 between the frame 12 and the guard, a pair of brackets 24 is secured to the frame adjacent to the brace 14 and this pair of brackets extends radially outwardly and has secured between the outer ends, the guard 19. The saw 10 thus passes between these brackets. See Figure 6.

At substantially midway between the ends of the frame 12 and the guard 19 a second pair of brackets 25, is secured to the frame 12 and extends radially outwardly and between the two brackets making up this pair, which correspond with the pair of brackets 24, the guard 19 is secured and the saw 10 passes. However, this pair of brackets 25 support between them a roller 26, across the periphery of which the inner edge of the saw 10 passes. See Figure 5.

Adjacent to each end of the circular portion of the frame 12, the frame has secured thereto a pair of inwardly extending wings 27 between which is rotatably supported a roller 28. These rollers are also upon the inner side of the annular saw body 10 and the inner edge of such saw body contacts the peripheries thereof so that the saw is rotatably supported upon the roller 26 and the rollers 28.

As shown the rollers 28 are on a line across the frame which is removed from the radial center of the saw and the saw guard 19 upon the side of such center away from the roller 26. Thus any tendency for the saw 10 to move away from the roller 26 is effectively prevented.

Upon the inner sides of the webs 27 of each pair and upon the inner sides of the plates 24 and 25 making up each pair, are secured guide blocks 29 which contact the side faces of the saw and maintain the same centered in the guard 19 so that the teeth will not come in contact with the side parts of the guard.

The bracket plate 22 is located between two tubular housings 30 and 31, the housing 31 carrying the oppositely directed attaching ears 32 which are secured to the bracket plate 22 by the bolts 33. See Figures 2 and 3.

Opposite from the lower ear 32 there is secured to the remote side of the plate 22, the angle supporting bracket 34 which is held in place by the adjacent bolt 33, while the other bolt 33 secures in place upon the same side of the plate 22 as the bracket 34, the outwardly extending bearing ears 35 between which extends a pivot pin 36. The tubular housing 30 lies between the bracket 34 and the bearing ear 35 and rests upon the bracket and is adapted to have movement relative to the housing 31.

In each end of each tubular housing is a bearing assembly 37 and extending through the tubular housing 31 and the two bearing assemblies therein, is the shaft 38 while a corresponding shaft 39 passes through the housing 30 and the two bearing assemblies therein.

As shown in Figure 3, the tubular housings 30 and 31 are supported upon the plate 22 so that their inner ends lie adjacent to the break 21 in the circular guard band and there is supported upon the inner end of each of the shafts 38 and 39, a friction roller 40 of suitable material, preferably fiber, the peripheral face of which is adapted to frictionally engage the adjacent side face of the saw 10.

At the outer ends of the tubular housings 30 and 31, is a gear housing which is generally designated 41 and which is made up of two sections 42 and 43 which are pivotally coupled together as indicated at 44 so that they may have slight oscillatory motion relative to one another and on an axis perpendicular to the shafts 38 and 39 and lying in a plane passing midway between such shafts.

Within the housing 41 are the two gears 45 and 46 which are mounted respectively upon the shafts 39 and 38. The housing sections 42 and 43 are joined to the adjacent tubular housings 30 and 31 respectively and it will thus be seen that if the inner ends of the tubular housings are pressed together or are forced apart slight rocking motion will be permitted between the gears while they remain in operative connection one with another.

The portions 42 and 43 of the gear housing 41 have similar or complementary outwardly extending substantially semi-circular portions 47 which are flanged as indicated at 48 to form a collar of circular form. This collar is engaged under a flanged securing ring 49 which is bolted or otherwise secured to a circular casting 50 which is designed for attachment to a motor which is shown in dotted outline and designated 51.

The central part of the casting 50 is in the form of a hub 52 through which may be extended a portion of the driving shaft 53 of the motor which may be formed to receive and have driving connection with the outer end of the shaft 38.

The numeral 54 designates a support upon which the motor is secured and integral with this support is a handle bar or hand grip 55. See Figure 1.

It will be apparent from the foregoing that the circular collar formed of the flange portions 48 and engaged in the locking ring 49 permits of relative turning movement between the motor and the saw structure.

In order to permit of the turning movement between the motor and saw and the securing of these two parts in adjusted relation, one of the flange portions 48 is provided with suitable notches 56 (Figure 7) in which may be selectively engaged the locking pawl 57 (Figure 2) which is carried by the lock lever 58 pivotally mounted upon the casting 50 as shown. A spring 59 connects the outer end of the lever 58 with an adjacent part of the casting and normally urges oscillation of the lever in a direction to engage the pawl in a locking or keeper notch 56.

Actuation of the locking lever 58 to permit the turning of the saw is accomplished by means of the control wire or cable 60 which is carried through a suitable guide 61 to the outer end of the handle bar 55 where it attaches to a control or hand grip lever 62. See Figure 1.

Sufficient play is allowed between the flanges 48 and the control or securing ring 49 to allow for the relative pivoting movement of the gear housing parts 42 and 43 to permit the necessary closing together of the friction wheels 40 against opposite sides of the saw. It will be readily appreciated that since only a very small fraction of an inch of movement of the friction rollers together is necessary to cause them to firmly bind the saw body 10 between them the amount of play between the gear housing portions need only be very small.

In order to effect the desired movement of the tubular housing 30 toward the housing 31 so as to bring the friction rollers into the desired contact with the adjacent faces of the saw, there is provided an operating or control cable or wire 63 which is attached at one end to the lever 17 and passed through the tubular guide 18, which extends around the top of the saw guard 19 to a point adjacent to the bearing ears 35. The wire 63 issues from the guide 18 at the bearing ears 35 and is attached to one end of a bell crank lever 64 which is pivotally mounted upon the pivot pin 63 and which has its other end extended part way across the adjacent movable tubular housing 30. See Figure 3. This housing 30 adjacent to the thrust applying tip 65 of the bell crank lever 64, is provided with a suitable bearing in the form of an outstanding lug 66 against which the tip or point 65 of the operating bell crank lever is adapted to engage.

The tubular housing 30 is normally urged away from the housing 31 by the substantially U-shaped expansion spring 67 (Figures 2 and 4) which has the legs adjacent to the free ends thereof curved oppositely to form the outwardly directed concave seats 68 in each of which an inner side of a tubular housing engages when the said ends of the spring are inserted between the housings as illustrated in Figures 2 and 4, between the gear housing 41 and the bracket plate 22. Thus it will readily be seen that so long as the control lever 17 is released the spring 67 will function to release the driving connection between the friction rollers 40 and the saw.

From the foregoing it will be readily apparent that there has been provided in the present device, a sawing machine which may be easily held in position while performing a sawing operation upon a tree, log or other body of timber.

In order that the saw may be firmly held against the rollers 26 and 28 the center line of the pair of tubular housings is angled slightly with respect to the radius of the saw, designated r so that such center line passes below the radial center r' of the saw as indicated by the broken line 69.

Figure 1, illustrates the manner of employing the frame arm for supporting the saw structure in initial working position for cutting into the large log A. Where the saw is used for cutting smaller logs such as the log B, the foot piece 13 will be rested against the side of the log so as to guide the saw downwardly through the log instead of horizontally as those guided by the use of the arm 14.

I claim:

1. Saw driving means in a sawing machine, having an arcuate guard and a flat annular saw rotatably supported by the guard and having teeth upon its outer periphery, a hand grip adjacent to one end of the guard, a tubular housing secured adjacent to one end to the saw guard upon the side thereof remote from said hand grip and extending outwardly from the guard, a second tubular housing supported in side by side relation with the first housing for movement relative thereto, a shaft rotatably supported in and passing through each tubular housing, a driving element supported upon each shaft for operative connection with the saw, a pivotal coupling means between the housings at the ends remote from said driving elements, a power unit, means coupling the power unit with the outer ends of the tubular housings, a driving connection between the power unit and one shaft, a driving connection between the shafts, and means for affecting the relative movement of the ends of the housings adjacent to the driving elements to bring said elements into operative connection with the saw.

2. A sawing machine as set forth in claim 1, including housing sections engaging said tubular housings and said power unit and relatively rotatable about the axis of that shaft having connection with the power unit for facilitating the relative turning of the power unit and the saw about the axis of that shaft having driving connection with the power unit.

3. A sawing machine as set forth in claim 1, with resilient means interposed between the tubular housings and normally urging the said driving element carrying ends of the housings apart, and the said means for relatively moving the housing together comprising a bell crank member pivotally supported upon the first mentioned housing and having an end arranged to impose pressure against the other housing to cause its movement toward the first housing, when the bell crank is oscillated in one direction, and means for affecting the oscillation of the bell crank in the said one direction.

4. A sawing machine as set forth in claim 1, including housing sections engaging said tubular housings and said power unit and relatively rotatable about the axis of that shaft having connection with the power unit for facilitating the relative turning of the power unit and the saw on the axis of that shaft having driving connection with the power unit, a hand grip connected with the power unit, and a latching mechanism carried adjacent to the last mentioned hand grip to be actuated therefrom and including a pivoted latching pawl adapted for selectively securing the power unit and the saw against relative turning.

5. In a circular saw, an arcuate housing, an annular saw provided with a plurality of cutting teeth on its outer periphery rotatably supported by said housing, a frame secured to one end of said housing, a plate member arranged on one side of said frame and secured thereto, a driving roller supported by said plate member and frictionally engaging said annular saw, a bar arranged on the other side of said frame and having one end pivotally connected thereto, a roller rotatably mounted on the other end of said bar and mounted for movement into and out of frictional engagement with said saw upon pivotal movement of said bar, and manually operable means for causing pivotal movement of said bar, said last-named means comprising a lug having one end secured to said plate member, a bellcrank lever pivotally supported by said lug and having an end arranged in engagement with said bar, a cable having one end connected to the other end of said bellcrank lever, a handle projecting from said housing and secured thereto, and an actuating lever pivotally secured to said housing and connected to the other end of said cable for causing pivotal movement of said bar.

6. In a circular saw, an arcuate housing, an annular saw provided with a plurality of cutting teeth on its outer periphery rotatably supported by said housing, a frame secured to one end of said housing, a plate member arranged on one side of said housing and secured thereto, a driving roller supported by said plate member and frictionally engaging said annular saw, a bar arranged on the other side of said frame and having one end pivotally connected thereto, a roller rotatably mounted on the other end of said bar and mounted for movement into and out of frictional engagement with said saw upon pivotal movement of said bar, and manually operable means for causing pivotal movement of said bar, said last-named means comprising a lug secured to said plate member, a bell crank lever movably connected to said lug and engaging said bar, a cable connected to said bell crank lever, an actuating member pivoted to said housing and connected to said cable for causing pivotal movement of said bar.

ALBERT P. SMITH.

REFERENCES CITED

The following references are of record in the file of this patent:

UNITED STATES PATENTS

| Number | Name | Date |
|---|---|---|
| 86,407 | Jenkins | Feb. 2, 1869 |
| 100,977 | Chamberlain | Mar. 22, 1870 |
| 252,268 | Silcott | Jan. 10, 1882 |
| 294,221 | Gorrell et al. | Feb. 26, 1884 |
| 1,388,186 | McCormick | Aug. 23, 1921 |
| 1,395,101 | Fite | Oct. 25, 1921 |
| 1,507,460 | Carroll | Sept. 2, 1924 |

FOREIGN PATENTS

| Number | Country | Date |
|---|---|---|
| 83,163 | Switzerland | Nov. 17, 1919 |
| 54,335 | Sweden | Apr. 18, 1923 |
| 70,233 | Sweden | Sept. 16, 1930 |
| 194,235 | Switzerland | Feb. 1, 1938 |